US006610802B2

(12) United States Patent
Roos et al.

(10) Patent No.: US 6,610,802 B2
(45) Date of Patent: Aug. 26, 2003

(54) PROCESS FOR SYNTHESIS OF POLYMER COMPOSITIONS, POLYMER COMPOSITIONS OBTAINABLE BY THE PROCESS, AND USE OF THE SAME

(75) Inventors: Sebastian Roos, Mainz (DE); Boris Eisenberg, Darmstadt (DE); Carolin Harpe, Bensheim (DE)

(73) Assignee: RohMax Additives GmbH, Darmstadt (DE)

( * ) Notice: Subject to any disclaimer, the term of this patent is extended or adjusted under 35 U.S.C. 154(b) by 0 days.

(21) Appl. No.: 09/865,526

(22) Filed: May 29, 2001

(65) Prior Publication Data

US 2003/0060587 A1 Mar. 27, 2003

(51) Int. Cl.[7] .................................................. C08F 4/06
(52) U.S. Cl. ........................ 526/135; 526/92; 526/145; 526/146; 526/147; 526/95; 526/124.8; 526/319; 526/318; 526/318.2; 526/317.1; 526/323.1; 526/329.7
(58) Field of Search ....................... 526/92, 319, 124.8, 526/323.1, 318.2, 318, 317.1, 329.7, 95, 137.1, 135, 145, 146, 147

(56) References Cited

U.S. PATENT DOCUMENTS

| | | | | |
|---|---|---|---|---|
| 5,211,928 A | * | 5/1993 | Rey et al. ................. | 423/321.1 |
| 5,807,937 A | * | 9/1998 | Matyjaszewski et al. ... | 526/135 |
| 6,348,554 B1 | | 2/2002 | Roos et al. | |
| 6,388,032 B1 | * | 5/2002 | Yamaura et al. ............ | 210/729 |
| 6,391,996 B1 | * | 5/2002 | Scherer et al. ........... | 526/317.1 |
| 6,403,745 B1 | * | 6/2002 | Scherer et al. ........... | 526/317.1 |
| 6,403,746 B1 | * | 6/2002 | Roos et al. ................. | 526/319 |

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

The present invention relates to a process for synthesis of polymer compositions with reduced catalyst content, wherein ethylenically unsaturated monomers containing less than 0.5 wt % of ethylenically unsaturated monomers with at least one carboxylic group, sulfonic acid group and/or at least one phosphonic acid group relative to the total weight of the ethylenically unsaturated monomers are polymerized by means of initiators containing a transferable group of atoms and of one or more catalysts comprising at least one transition metal in the presence of ligands which can form a coordination compound with the metal catalyst or catalysts and, after the polymerization, the catalyst contained in the polymer is at least partly separated. For this purpose, the polymer composition is filtered, after the polymerization, in the presence of at least one filter aid which contains at least 0.5 wt %, relative to the total weight of the filter aid, of repeating units that contain at least one carboxylic acid group, sulfonic acid group and/or at least one phosphonic acid group.

22 Claims, No Drawings

PROCESS FOR SYNTHESIS OF POLYMER COMPOSITIONS, POLYMER COMPOSITIONS OBTAINABLE BY THE PROCESS, AND USE OF THE SAME

The present invention relates to processes for synthesis of polymer compositions with reduced catalyst content, wherein ethylenically unsaturated monomers containing less than 0.5 wt % of ethylenically unsaturated monomers with at least one carboxylic group, sulfonic acid group and/or at least one phosphonic acid group relative to the total weight of the ethylenically unsaturated monomers are polymerized by means of initiators containing a transferable group of atoms and of one or more catalysts comprising at least one transition metal in the presence of ligands which can form a coordination compound with the metal catalyst or catalysts and, after the polymerization, the catalyst present in the polymer is at least partly separated. The present invention also relates to polymer compositions obtainable by the inventive method as well as to the use of same.

Radical polymerization is an important commercial process for synthesis of diverse polymers, such as PMMA and polystyrene. It suffers from the disadvantage that it is relatively difficult to control the composition of the polymers, the molecular weight and the molecular weight distribution.

One solution to this problem is offered by the so-called ATRP process (=Atom Transfer Radical Polymerization). It is assumed that this process comprises "living" radical polymerization, although the description of the mechanism is not to be construed as limitative. In this process a transition metal compound is reacted with a compound containing a transferable group of atoms. Under these conditions the transferable group of atoms is transferred to the transition metal compound, whereby the metal is oxidized. A radical that adds onto ethylenic groups is formed in this reaction. The transfer of the group of atoms to the transition metal compound is reversible, however, and so the group of atoms is transferred back to the growing polymer chain, whereby a controlled polymerization system is formed. Accordingly it is possible to control the composition of the polymer, the molecular weight and the molecular weight distribution.

This reaction procedure is described, for example, by J -S. Wang et al., J. Am. Chem. Soc., Vol. 117, pp. 5614–5615 (1995), and by Matyjaszewski, Macromolecules, Vol. 28, pp. 7901–7910 (1995). Furthermore, International Patent Applications WO 96/30421, WO 97/47661, WO 97/18247, WO 98/20050, WO 98/40415 and WO 99/10387 disclose modifications of the aforesaid ATRP.

The mechanism described hereinabove is not undisputed. WO 97/47661, for example, states that polymerization takes place by insertion, and not by a radical mechanism. Such a differentiation is not pertinent to the present invention, however, since in the reaction procedure disclosed in WO 97/47661 there are used compounds which are also employed for ATRP.

The monomers, transition metal catalysts, ligands and initiators are chosen on the basis of the polymer solution desired. It is assumed that a high rate constant of the reaction between the transition metal/ligand complex and the transferable group of atoms, plus a low equilibrium concentration of free radicals, is essential for a narrow molecular weight distribution. If the free radical concentration is too high, typical termination reactions, which are responsible for a broad molecular weight distribution, will occur. The exchange rate depends, for example, on the transferable group of atoms, on the transition metal, on the ligands and on the anion of the transition metal compound. The person skilled in the art will find valuable advice on selection of these compounds in, for example, International Patent WO 98/40415. The advantages of known ATRP processes, however, are largely limited to monomers which are themselves polar or which are readily soluble in polar media. Certainly the occasional use of nonpolar aprotic hydrocarbons such as benzene, toluene, xylene, cyclohexane and hexane is also known from the literature, but the polymers synthesized with these solvents exhibit much greater polydispersity. This effect is described in, for example, WO 98/40415.

The same document also discloses the possibility of polymerizing polar monomers such as methyl methacrylate or styrene by means of metallic copper, but the molecular weight distribution is much more unfavorable than in the use of a mixture of $Cu^0/CuBr$ or $Cu^0/CuBr_2$.

In Pol. Preprint (ACS, Div. Pol. Chem)., 1999, 40(2), 432, M. J. Ziegler et al. state among other facts that the polymerization of t-butyl methacrylate is difficult to control if the said process takes place in bulk. Both the molecular weight and the polydispersity can be improved by using approximately 20 to 25 wt % of polar solvents. Of course, because of the limited solubility in polar solvents of ethylenically unsaturated ester compounds containing alkyl or heteroalkyl groups with at least 8 carbon atoms, it is difficult by means of the known ATRP processes to polymerize ethylenically unsaturated monomer mixtures that contain at least 50 wt % of ethylenically unsaturated ester compounds containing alkyl or heteroalkyl chains with at least 8 carbon atoms. Furthermore, depending on use, these large volumes of polar solvents must be separated from the composition after synthesis of the polymers.

A further disadvantage of the known ATRP processes can be seen in the fact that the resulting polymers and polymer solutions contain residues of the metal catalysts used. These catalyst residues can be detrimental for many applications, since they adversely influence the product properties of the polymer and also can lower its environmental compatibility.

Because of the high viscosity of the polymer solution and the small particle size of the catalyst, separation of the catalyst residues by means of filtration is possible—if at all—only with difficulty and by means of time-consuming and costly procedures. It requires the use of relatively large quantities of filter aids, which are known in themselves, such as cellulose, silica gel, Kieselgur (such as Celite®), perlite, wood charcoal and sawdust, whereby the filtration rate is reduced so severely that practical application of such processes for separation of catalyst residues is not possible on the large industrial scale.

In view of the prior art, it was now an object of the present invention to provide, for synthesis of a polymer composition, a process that is substantially free of catalyst residues. In particular, the process should be applicable in simple manner on a large industrial scale.

A further object of the present invention was also to provide, for synthesis of a polymer composition, a process in which the polymers contained in the composition have a structure in which at least 50 wt % comprises ethylenically unsaturated ester compounds of formula (I)

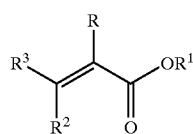

wherein R denotes hydrogen or methyl, $R^1$ denotes a straight-chain or branched alkyl group with 1 to 40 [carbon atoms], $R^2$ and $R^3$ independently denote hydrogen or a group of the formula —COOR', wherein R' denotes hydrogen or a straight-chain or branched alkyl group with 1 to 40 carbon atoms. In this connection, the process should be suitable in particular for synthesis of a polymer composition in which the polymers contained in the composition have a structure in which at least 50 wt % comprises (meth) acrylates with alkyl or heteroalkyl chains containing at least 8 carbon atoms.

Another object of the present invention was that the polymers contained in the composition must have a narrow molecular weight distribution. In particular, it is intended that the use of relatively complex processes, such as anionic polymerization, will be avoided for synthesis of the polymer mixture.

A further object was also to be seen in providing, for synthesis of a polymer composition, a process which permits by simple procedures the synthesis of copolymers with a non-statistical structure, especially the synthesis of two-block, three-block and gradient copolymers.

Another object of the present invention was to provide a polymerization process by which polymers with relatively high or high molecular weights can be obtained.

Yet another object was to provide a process that can be performed inexpensively and applied on a large industrial scale. Furthermore, the process should be possible easily and simply with commercially available components.

These objects are achieved by a process for synthesis of a polymer composition having all features of claim 1, as are other objects which are not explicitly cited but which can be obviously derived or inferred from the relationships discussed herein in the introduction. Expedient modifications of the inventive process are protected in the dependent claims which refer back to claim 1. The independent product claim relates to the polymer compositions that can be obtained by the inventive process, and the present use claim describes a preferred use according to the invention of the inventive polymer compositions.

By the fact that, in a process of the type cited in the introduction, the polymer composition, after polymerization, is filtered in the presence of at least one filter aid which contains at least 0.5 wt %, relative to the total weight of the filter aid, of repeating units that contain at least one carboxylic acid group, sulfonic acid group and/or at least one phosphonic acid group, it has become possible in a way that is not directly foreseeable to provide a process for synthesis of a polymer composition that is substantially free of transition metal compounds. This type of synthesis can be performed particularly inexpensively and is therefore eminently suitable for industrial production.

At the same time, several other advantages can be achieved by the inventive process. They include among others:

The inventive process permits separation of the catalyst residues with very high filtration rates.

It is particularly suitable for the synthesis of polymer compositions whose structure comprises at least 50 wt % of ethylenically unsaturated ester compounds of formula (I)

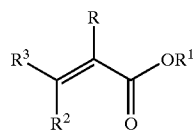

wherein R denotes hydrogen or methyl, $R^1$ denotes a straight-chain or branched alkyl group with 1 to 40 [carbon atoms], $R^2$ and $R^3$ independently denote hydrogen or a group of the formula —COOR', where R' denotes hydrogen or a straight-chain or branched alkyl group with 1 to 40 carbon atoms. In this connection, it has proved to be most particularly advantageous for synthesis of polymer compositions having a structure in which at least 50 wt % comprises (meth)acrylates with alkyl or heteroalkyl chains containing at least 8 carbon atoms.

The polymers in the polymer compositions synthesized by the process are characterized by a narrow molecular weight distribution.

The inventive process permits excellent control of the molecular weight of the polymers contained in the compositions.

The polymerization can be performed with relatively few problems as regards pressure, temperature and solvent, acceptable results being obtained under certain circumstances even at moderate temperatures.

High yields can be achieved by means of the inventive process.

The inventive process has very few side reactions.

The process can be performed inexpensively. In this respect it should be kept in mind that only very small quantities of filter aids are used.

Polymers with a predetermined composition and tailor-made structure can be synthesized by means of the process of the present invention. In particular, copolymers with a non-statistical structure, especially two-block, three-block and gradient copolymers, are accessible in simple manner by the inventive process.

By means of the inventive process it is possible to copolymerize monomers with unsaturated ester compounds that themselves can function as ligands. A particularly surprising discovery is that a narrow molecular weight distribution is obtained under these conditions.

According to the present invention, what is polymerized is ethylenically unsaturated monomers which contain less than 0.5 wt %, expediently less than 0.1 wt %, especially zero ethylenically unsaturated monomers with at least one carboxylic group, sulfonic acid group and/or at least one phosphonic acid group relative to the total weight of the ethylenically unsaturated monomers. Ethylenically unsaturated monomers are very familiar to those skilled in the art. They include all organic compounds that contain at least one ethylenic double bond.

Ethylenically unsaturated monomers with at least one carboxylic acid group, sulfonic acid group and/or at least one phosphonic acid group comprise all organic compounds which contain not only at least one ethylenic double bond but also at least one carboxylic acid group, sulfonic acid group and/or at least one phosphonic acid group. Examples thereof include:

acrylic acid,
methacrylic acid,
1-[2-(isopropenylcarbonyloxy)ethyl] maleate (monoester of 2-hydroxyethyl methacrylate (HEMA) and maleic acid), 1-[2-(vinylcarbonyloxy)ethyl] maleate (monoester of 2-hydroxyethyl acrylate (HEA) and maleic acid),
1-[2-(isopropenylcarbonyloxy)ethyl] succinate (monoester of HEMA and succinic acid),
1-[2-(vinylcarbonyloxy)ethyl] succinate (monoester of HEA and succinic acid),
1-[2-(isopropenylcarbonyloxy)ethyl] phthalate (monoester of HEMA and phthalic acid),
1-[2-(vinylcarbonyloxy)ethyl] phthalate (monoester of HEA and phthalic acid),
1-[2-(isopropenylcarbonyloxy)ethyl] hexahydrophthalate (monoester of HEMA and hexahydrophthalic acid),
1-[2-(vinylcarbonyloxy)ethyl] hexahydrophthalate (monoester of HEA and hexahydrophthalic acid),
1-[2-(isopropenylcarbonyloxy)butyl] maleate (monoester of 2-hydroxybutyl methacrylate (HBMA) and maleic acid),
1-[2-(vinylcarbonyloxy)butyl] maleate (monoester of 2-hydroxybutyl methacrylate (HBA) and maleic acid),
1-[2-(isopropenylcarbonyloxy)butyl] succinate (monoester of HBMA and succinic acid),
1-[2-(vinylcarbonyloxy)butyl] succinate (monoester of HBA and succinic acid),
1-[2-(isopropenylcarbonyloxy)butyl] phthalate (monoester of HBMA and phthalic acid),
1-[2-(vinylcarbonyloxy)butyl] phthalate (monoester of HBA and phthalic acid),
1-[2-(isopropenylcarbonyloxy)butyl] hexahydrophthalate (monoester of HBMA and hexahydrophthalic acid),
1-[2-(vinylcarbonyloxy)butyl] hexahydrophthalate (monoester of HBA and hexahydrophthalic acid),
fumaric acid,
monoesters of fumaric acid,
maleic acid,
monoesters of maleic acid,
crotonic acid,
itaconic acid,
acrylamidoglycolic acid,
methacrylamidobenzoic acid,
cinnamic acid,
vinylacetic acid,
trichloroacrylic acid,
10-hydroxy-2-decenic acid,
4-methacryloxyethyl trimethyl acid,
styrenecarboxylic acid,
2-(isopropenylcarbonyloxy)-ethanesulfonic acid,
2-(vinylcarbonyloxy)-ethanesulfonic acid,
2-(isopropenylcarbonyloxy)-propylsulfonic acid,
2-(vinylcarbonyloxy)-propylsulfonic acid,
2-acrylamido-2-methylpropanesulfonic acid,
acrylamidododecanesulfonic acid,
2-propene-1-sulfonic acid,
methallylsulfonic acid,
styrenesulfonic acid,
styrenedisulfonic acid,
methacrylamidoethanephosphonic acid,
vinylphosphonic acid.

According to the invention, especially preferred ethylenically unsaturated monomers are such that contain, relative to the total weight of ethylenically unsaturated monomers, 50 to 100 wt %, preferably 60 to 100 wt % of one or more ethylenically unsaturated ester compounds of formula (I)

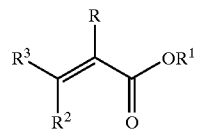

wherein R denotes hydrogen or methyl, $R^1$ denotes a straight-chain or branched alkyl group with 1 to 40 carbon atoms, $R^2$ and $R^3$ independently denote hydrogen or a group of the formula —COOR', where R' denotes hydrogen or a straight-chain or branched alkyl group with 1 to 40 carbon atoms. The said alkyl group can be straight-chain, cyclic or branched.

These compounds according to formula (I) include (meth)acrylates, maleates and fumarates, each of which has at least one alcohol group with 1 to 40 carbon atoms.

Most particularly preferred ethylenically unsaturated monomers are such that contain, relative to the total weight of ethylenically unsaturated monomers, 50 to 100 wt %, preferably 60 to 100 wt % of one or more ethylenically unsaturated ester compounds of formula (II)

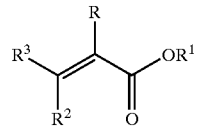

wherein R denotes hydrogen or methyl, $R^1$ denotes a straight-chain or branched alkyl group with 8 to 40, preferably 10 to 40 carbon atoms, especially expediently 10 to 24 carbon atoms, $R^2$ and $R^3$ independently denote hydrogen or a group of the formula —COOR', where R' denotes hydrogen or a straight-chain or branched alkyl group with 8 to 40, preferably 10 to 40 carbon atoms. The said alkyl group can be straight-chain, cyclic or branched.

For this purpose there are preferred (meth)acrylates of formula (III)

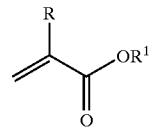

wherein
  R denotes hydrogen or methyl and $R^1$ denotes a straight-chain or branched alkyl group with 8 to 40, preferably 10 to 40 carbon atoms.

The expression (meth)acrylates includes methacrylates and acrylates as well as mixtures of the two. These monomers are widely known. The (meth)acrylates of formula (III) include among others
(meth)acrylates derived from saturated alcohols, such as 2-ethylhexyl (meth)acrylate, octyl (meth)acrylate, nonyl (meth)acrylate, isooctyl (meth)acrylate, isononyl (meth)acrylate, 2-tert-butylheptyl (meth)acrylate, 3-isopropylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tertbutyloctadecyl (meth)acrylate, 5-ethyloctadecyl (meth) acrylate, 3-isopropyloctadecyl (meth)acrylate, octadecyl (meth)acrylate, nonadecyl (meth)acrylate, eicosyl (meth) acrylate, cetyleicosyl (meth)acrylate, stearyleicosyl (meth)acrylate, docosyl (meth)acrylate and/or eicosyltetratriacontyl (meth)acrylate;

(meth)acrylates derived from unsaturated alcohols, such as oleyl (meth)acrylate; cycloalkyl (meth)acrylates, such as 3-vinyl-2-butylcyclohexyl (meth)acrylate and bornyl (meth)acrylate.

Within the scope of the present invention, the ester compounds with long-chain alcohol groups are designated a). They can be obtained, for example, by reaction of (meth)acrylates, fumarates, maleates and/or the corresponding acids with long-chain fatty alcohols, in which reaction a mixture of esters such as (meth)acrylates with alcohol groups of various chain lengths is generally obtained. These fatty alcohols include among others Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea; Epal® 610 and Epal® 810 of Ethyl Corporation; Linevol® 79, Linevol® 911 and Dobanol® 25L of Shell AG; Lial® 125 of Condea Augusta, Milan; Dehydad® and Lorol® of Henkel KGaA as well as Linopol® 7–11 and Acropol® 91 of Ugine Kuhlmann.

In addition to the ethylenically unsaturated ester compounds designated as component a), which are derived from alcohols with 8 to 40 carbon atoms, the monomer mixture expediently can also contain further ethylenically unsaturated monomers that can be copolymerized with the aforesaid ester compounds. These monomers include among others b) 0 to 40 wt %, especially 0.5 to 20 wt % of one or more (meth)acrylates of formula (IV)

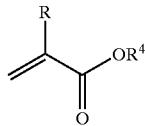

wherein R denotes hydrogen or methyl and $R^4$ denotes a straight-chain or branched alkyl group with 1 to 7 carbon atoms, c) 0 to 40 wt %, especially 0.5 to 20 wt % of one or more (meth)acrylates of formula (V)

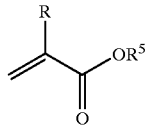

wherein R denotes hydrogen or methyl and $R^5$ denotes an alkyl group, substituted with an OH group, with 2 to 20, especially 2 to 6 carbon atoms, or an alkoxylated group of formula (VI)

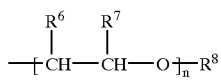

wherein $R^6$ and $R^7$ independently stand for hydrogen or methyl, $R^8$ stands for hydrogen or an alkyl group with 1 to 40 carbon atoms, and n stands for an integral number from 1 to 60, d) 0 to 40 wt %, especially 0.5 to 20 wt % of one or more (meth)acrylates of formula (VII)

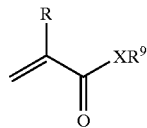

wherein R denotes hydrogen or methyl, X denotes oxygen or an amino group of formula —NH— or —NR$^{10}$—, wherein $R^{10}$ stands for an alkyl group with 1 to 40 carbon atoms, and $R^9$ denotes a straight-chain or branched alkyl group, substituted by at least one —NR$^{11}$R$^{12}$ group, with 2 to 20, preferably 2 to 6 carbon atoms, wherein $R^{11}$ and $R^{12}$ independently of one another stand for hydrogen, an alkyl group with 1 to 20, preferably 1 to 6 [carbon atoms], or wherein $R^{11}$ and $R^{12}$, including the nitrogen atom and possibly a further nitrogen or oxygen atom, form a 5-membered or 6-membered ring, which may or may not be substituted with $C_1$ to $C_6$ alkyl, and e) 0 to 40 wt %, especially 0.5 to 20 wt % of one or more comonomers, wherein the wt % value in each case refers to the total weight of ethylenically unsaturated monomers.

Examples of component b) include among others (meth) acrylates derived from saturated alcohols, such as methyl (meth)acrylate, ethyl (meth)acrylate, n-propyl (meth) acrylate, isopropyl (meth)acrylate, n-butyl (meth)acrylate, tert-butyl (meth)acrylate, pentyl (meth)acrylate, hexyl (meth)acrylate and heptyl (meth)acrylate; cycloalkyl (meth) acrylates such as cyclopentyl (meth)acrylate and cyclohexyl (meth)acrylate; (meth)acrylates derived from unsaturated alcohols, such as 2-propynyl (meth)acrylate, allyl (meth) acrylate and vinyl (meth)acrylate.

(Meth)acrylates according to formula (V) are known to those skilled in the art. They include among others hydroxyalkyl (meth)acrylates such as
3-hydroxypropyl methacrylate,
3,4-dihydroxybutyl methacrylate,
2-hydroxyethyl methacrylate,
2-hydroxypropyl methacrylate, 2,5-dimethyl-1,6-hexanediol methacrylate,
1,10-decanediol methacrylate,
1,2-propanediol methacrylate;
polyoxyethylene and polyoxypropylene derivatives of (meth)acrylic acid, such as
triethylene glycol (meth)acrylate,
tetraethylene glycol (meth)acrylate and
tetrapropylene glycol (meth)acrylate.

The (meth)acrylates or (meth)acrylamides according to formula (VII) (component d) include among others amides of (meth)acrylic acid, such as
N-(3-dimethylaminopropyl) methacrylamide,
N-(diethylphosphono) methacrylamide,
1-methacryloylamido-2-methyl-2-propanol,
N-(3-dibutylaminopropyl) methacrylamide,
N-t-butyl-N-(diethylphosphono) methacrylamide,
N,N-bis(diethylaminoethyl) methacrylamide,
4-methacryloylamido-4-methyl-2-pentanol,
N-(methoxymethyl) methacrylamide,
N-(2-hydroxyethyl) methacrylamide,
N-acetyl methacrylamide,
N-(dimethylaminoethyl) methacrylamide,
N-methyl-N-phenyl methacrylamide,
N,N-diethyl methacrylamide, N-methyl methacrylamide,
N-N-dimethyl methacrylamide,
N-isopropyl methacrylamide;
aminoalkyl methacrylates, such as
tris(2-methacryloxyethyl)amine,
N-methylformamidoethyl methacrylate,
2-ureidoethyl methacrylate;
heterocyclic (meth)acrylates such as 2-(1-imidazolyl)ethyl (meth)acrylate, 2-(4-morpholinyl)ethyl (meth)acrylate and 1-(2-methacryloyloxyethyl)-2-pyrrolidone.

Component e) comprises in particular ethylenically unsaturated monomers that can be copolymerized with the ethylenically unsaturated ester compounds of formulas (II), (III), (IV), (V) and/or (VII). However, they do not contain any carboxylic acid groups, sulfonic acid groups and/or phosphonic acid groups.

In the scope of the present invention, comonomers which are particularly suitable for polymerization are those corresponding to the formula:

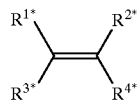

wherein $R^{1*}$ and $R^{2*}$ are selected independently from the group comprising hydrogen, halogens, CN, straight-chain or branched alkyl groups with 1 to 20, preferably 1 to 6 and especially preferably 1 to 4 carbon atoms, which may be substituted with 1 to (2n+1) halogen atoms, wherein n is the number of carbon atoms of the alkyl group (for example, $CF_3$), α,β-unsaturated straight-chain or branched alkenyl or alkynyl groups with 2 to 10, preferably 2 to 6 and especially preferably 2 to 4 carbon atoms, which may be substituted with 1 to (2n−1) halogen atoms, preferably chlorine, wherein n is the number of carbon atoms of the alkyl group, for example $CH_2=CCl-$, cycloalkyl groups with 3 to 8 carbon atoms, which may be substituted with 1 to (2n−1) halogen atoms, preferably chlorine, wherein n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$ which can be quaternized with an additional $R^{8*}$, aryl or heterocyclyl group, wherein $Y^*$ can be $NR^{8*}$, S or O, preferably O; $R^{5*}$ is an alkyl group with 1 to 20 carbon atoms, an alkylthio group with 1 to 20 carbon atoms, an alkoxy group with 1 to 20 carbon atoms, an aryloxy or heterocyclyloxy group; $R^{6*}$ and $R^{7*}$ independently are hydrogen or an alkyl group with 1 to 20 carbon atoms, or $R^{6*}$ and $R^{7*}$ together can form an alkylene group with 2 to 7, preferably 2 to 5 carbon atoms, wherein they form a 3-membered to 8-membered ring, preferably a 3-membered to 6-membered ring, and $R^{8*}$ is hydrogen, a straight-chain or branched alkyl group or aryl group with 1 to 20 carbon atoms; $R^{3*}$ and $R^{4*}$ are independently selected from the group comprising hydrogen, halogen (preferably fluorine or chlorine), alkyl groups with 1 to 6 carbon atoms and $COOR^{9*}$, wherein $R^{9*}$ is hydrogen, an alkali metal or an alkyl group with 1 to 40 carbon atoms, or $R^{1*}$ and $R^{3*}$ together can form a group of formula $(CH_2)_{n'}$, which may be substituted with 1 to 2n' halogen atoms or $C_1$ to $C_4$ alkyl groups, or can form the formula $(C(=O)-Y^*-C(=O))$, wherein n' is from 2 to 6, preferably 3 or 4 and $Y^*$ is as defined hereinabove; and wherein at least 2 of the groups $R^{1*}$, $R^{2*}$, $R^{3*}$ and $R^{4*}$ are hydrogen or halogen.

Component e) comprises in particular ethylenically unsaturated monomers that can be copolymerized with the ester compounds of formula (I). They include among others nitriles of (meth)acrylic acid and other nitrogen-containing methacrylates, such as
methacryloylamidoacetonitrile,
2-methacryloyloxyethyl methyl cyanamide,
cyanomethyl methacrylate;
aryl methacrylates, such as benzyl methacrylate or phenyl methacrylate, wherein each of the aryl groups can be unsubstituted or be substituted at up to four positions;
carbonyl-containing methacrylates, such as
oxazolidinylethyl methacrylate,
N-(methacryloyloxy)formamide,
acetonyl methacrylate,
N-methacryloylmorpholine,
N-methacryloyl-2-pyrrolidinone;
glycol dimethacrylates, such as 1,4-butanediol methacrylate,
2-butoxyethyl methacrylate,
2-ethoxyethoxymethyl methacrylate,
2-ethoxyethyl methacrylate,
methacrylates of ether alcohols, such as
tetrahydrofurfuryl methacrylate,
vinyloxyethoxyethyl methacrylate,
methoxyethoxyethyl methacrylate,
1-butoxypropyl methacrylate,
1-methyl-(2-vinyloxy)ethyl methacrylate,
cyclohexyloxymethyl methacrylate,
methoxymethoxyethyl methacrylate,
benzyloxymethyl methacrylate,
furfuryl methacrylate,
2-butoxyethyl methacrylate,
2-ethoxyethoxymethyl methacrylate,
2-ethoxyethyl methacrylate,
allyloxymethyl methacrylate,
1-ethoxybutyl methacrylate,
methoxymethyl methacrylate,
1-ethoxyethyl methacrylate,
ethoxymethyl methacrylate;
methacrylates of halogenated alcohols, such as
2,3-dibromopropyl methacrylate,
4-bromophenyl methacrylate,
1,3-dichloro-2-propyl methacrylate,
2-bromoethyl methacrylate,
2-iodoethyl methacrylate,
chloromethyl methacrylate;
oxiranyl methacrylates, such as
2,3-epoxybutyl methacrylate,
3,4-epoxybutyl methacrylate,
glycidyl methacrylate;
methacrylates containing phosphorus, boron and/or silicon, such as
2-(dimethylphosphato)propyl methacrylate,
2-(ethylenephosphito)propyl methacrylate,
dimethylphosphinomethyl methacrylate,
dimethylphosphonoethyl methacrylate,
diethylmethacryloyl phosphonate,
dipropylmethacryloyl phosphate;
sulfur-containing methacrylates, such as
ethylsulfinylethyl methacrylate,
4-thiocyanatobutyl methacrylate,
ethylsulfonylethyl methacrylate,
thiocyanatomethyl methacrylate,
methylsulfinylmethyl methacrylate,
bis(methacryloyloxyethyl) sulfide;
trimethacrylates, such as
trimethyloylpropane trimethacrylate;
vinyl halides, such as vinyl chloride, vinyl fluoride, vinylidene chloride and vinylidene fluoride;

vinyl esters, such as vinyl acetate;
styrene, substituted styrenes with an alkyl substituent in the side chain, such as α-methylstyrene and α-ethylstyrene, substituted styrenes with an alkyl substituent on the ring, such as vinyltoluene and p-methylstyrene, halogenated styrenes such as monochlorostyrenes, dichlorostyrenes, tribromostyrenes and tetrabromostyrenes;
heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
maleic acid derivatives, such as diesters of maleic acid, wherein the alcohol groups have 1 to 9 carbon atoms, maleic anhydride, methylmaleic anhydride, maleimide, methylmaleimide; fumaric acid derivatives, such as diesters of fumaric acid, wherein the alcohol groups have 1 to 9 carbon atoms;
dienes such as divinylbenzene.

In addition to styrene there are preferred in particular as comonomers monomers that have dispersing effects, such as the heterocyclic vinyl compounds mentioned hereinabove. These monomers will be referred to hereinafter as dispersing monomers.

The ethylenically unsaturated monomers mentioned hereinabove can be used individually or as mixtures. It is also possible to vary the monomer composition during polymerization, in order to obtain well defined structures such as block copolymers.

In preferred embodiments of the inventive process, at least 70 weight per cent of the ethylenically unsaturated monomers, especially preferably more than 80 wt % of the ethylenically unsaturated monomers, relative to the total weight of the ethylenically unsaturated monomers are (meth)acrylates, maleates and/or fumarates with alkyl or heteroalkyl chains containing at least 6 carbon atoms.

To carry out the polymerization there are used catalysts that comprise at least one transition metal. For this purpose there can be used any transition metal compound that can participate in a redox cycle with the initiator or with the polymer chain, which contains a transferable group of atoms. In these cycles the transferable group of atoms and the catalyst reversibly form a compound, wherein the oxidation number of the transition metal is raised or lowered. It is assumed that radicals are liberated and trapped in this process, and so the radical concentration remains very low. It is also possible, however, that the insertion of ethylenically unsaturated monomers into the Y—X or Y(M)$_z$—X bond is made possible or facilitated by the addition of the transition metal compound to the transferable group of atoms, where Y and X have the same meaning as given hereinabove and M denotes the monomers, while z indicates the degree of polymerization.

Preferred transition metals for this purpose are Cu, Fe, Co, Cr, Ne, Sm, Mn, Mo, Ag, Zn, Pd, Pt, Re, Rh, Ir, In, Yb and/or Ru, which can be used in appropriate oxidation numbers. These metals can be used individually and also as mixtures. It is assumed that these metals catalyze the redox cycles of the polymerization. In this connection, the $Cu^+/Cu^{2+}$ or $Fe^{2+}/Fe^{3+}$ redox couple, for example, is effective. Accordingly, the metal compounds are added to the reaction mixture in the form of halides such as chloride or bromide, as alkoxide, hydroxide, oxide, sulfate, phosphate, or hexafluorophosphate, trifluoromethanesulfate. The preferred metal compounds include $Cu_2O$, CuBr, CuCl, CuI, $CuN_3$, CuSCN, CuCN, $CuNO_2$, $CuNO_3$, $CuBF_4$, $Cu(CH_3COO)$, $Cu(CF_3COO)$, $FeBr_2$, $RuBr_2$, $CrCl_2$ and $NiBr_2$.

It is also possible, however, to use compounds with higher oxidation numbers, such as $CuBr_2$, $CuCl_2$, CuO, $CrCl_3$, $Fe_2O_3$ and $FeBr_3$. In these cases the reaction can be initiated by means of classical radical sources, such as AIBN. In this case the transition metal compounds are reduced first of all, since they are reacted with the radicals generated from the classical radical sources. Such a process is reverse ATRP, as described by Wang and Matyjaszewski in Macromolecules (1995), Vol. 28, pp. 7572–7573.

Furthermore, the transition metals can be used for catalysis in the form of metals of oxidation number zero, especially in a mixture with the compounds mentioned hereinabove, as is described in, for example, International Patent WO 98/40415. In these cases the reaction velocity of the reaction can be increased. It is assumed that hereby the concentration of catalytically active transition metal compound is increased by using equal proportions of transition metals having high oxidation numbers and of metallic transition metal.

The preferred transition metals include metallic copper, which can be added to the reaction mixture in the form, for example, of copper sheet, copper wire, copper foil, copper shavings, copper gauze, copper braid, copper textile and/or copper powder as well as copper dust. In this connection, sources that can be readily separated once again from the polymer composition, such as copper sheet, copper wire, copper foil and copper braid are preferred over sources that are less easy to separate, such as copper powder or copper dust.

In general, the molar ratio of transition metal to initiator ranges from 0.0001:1 to 10:1, preferably from 0.001:1 to 5:1 and especially preferably from 0.01:1 to 2:1, although these values are not to be construed as limitative. The monomers mentioned hereinabove are polymerized by means of initiators that contain a transferable group of atoms. In general, these initiators can be described by the formula $Y—(X)_m$, where Y and X have the same meaning as given hereinabove and m denotes an integral number in the range of 1 to 10, depending on the functionality of group Y. If m>1, the various groups X of atoms can have different meanings. If the functionality of the initiator is >2, star polymers are obtained. Preferred transferable atoms or groups of atoms are halogens, for example Cl, Br and/or I.

As mentioned hereinabove, it is assumed that group Y forms radicals that function as starter molecules, in that this radical adds onto the ethylenically unsaturated monomers. Thus group Y preferably has substituents that can stabilize the radicals. Such substituents include among others —CN, —COR and —CO$_2$R, wherein R in each case denotes an alkyl or aryl group, or aryl and/or heteroaryl groups.

Alkyl groups are saturated or unsaturated, branched or straight-chain hydrocarbon groups with 1 to 40 carbon atoms, such as methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl groups are cyclic aromatic groups having 6 to 14 carbon atoms in the aromatic ring. These groups may be substituted. Examples of substituents are straight-chain and branched alkyl groups with 1 to 6 carbon atoms, such as methyl, ethyl, propyl, butyl, pentyl, 2-methylbutyl or hexyl; cycloalkyl groups such as cyclopentyl and cyclohexyl; aromatic groups such as phenyl or naphthyl; amino groups, ether groups, ester groups as well as halides.

Examples of aromatic groups include phenyl, xylyl, toluyl, naphthyl or biphenylyl.

The expression "heteroaryl" denotes a heteroaromatic ring system, wherein at least one CH group is replaced by N or two neighboring CH groups are replaced by S, O or NH, such as a thiophene, furan, pyrrole, thiazole, oxazole, pyridine, pyrimidine and benzo[a]furan group, which may also contain the substituents mentioned hereinabove.

An initiator that is usable according to the invention can be any compound that contains one or more atoms or groups of atoms which can be transferred by a radical mechanism under the polymerization conditions.

Suitable initiators include those of the formulas:

$$R^{11}R^{12}R^{13}C-X$$

$$R^{11}C(=O)-X$$

$$R^{11}R^{12}R^{13}Si-X$$

$$R^{11}R^{12}N-X$$

$$R^{11}N-X_2$$

$$(R^{11})_nP(O)_m-X_{3-n}$$

$$(R^{11}O)_nP(O)_m-X_{3-n} \text{ and}$$

$$(R^{11})(R^{12}O)P(O)_m-X,$$

wherein X is selected from the group comprising Cl, Br, I, $OR^{10}$ [wherein $R^{10}$ denotes an alkyl group with 1 to 20 carbon atoms, in which each hydrogen atom independently can be replaced by a halide, preferably fluoride or chloride, alkenyl with 2 to 20 carbon atoms, preferably vinyl, alkynyl with 2 to 10 carbon atoms, preferably acetylenyl, phenyl, which can be substituted with 1 to 10 halogen atoms or alkyl groups with 1 to 4 carbon atoms, or aralkyl (aryl-substituted alkyl, such as benzyl, for example, in which the aryl group represents phenyl or substituted phenyl and the alkyl group represents an alkyl with 1 to 6 carbon atoms]; $SR^{14}$, $SeR^4$, $OC(=O)R^{14}$, $OP(=O)R^{14}$, $OP(=O)(OR^{14})_2$, $OP(=O)$ $OR^{14}$, $O-N(R^{14})_2$, $S-C(=S)N(R^{14})_2$, CN, NC, SCN, CNS, OCN, CNO and $N_3$, wherein $R^{14}$ denotes an aryl group or a straight-chain or branched alkyl group with 1 to 20, preferably 1 to 9 carbon atoms, wherein two $R^{14}$ groups, if present, can together form a 5-membered, 6-membered or 7-membered heterocyclic ring; and $R^{11}$, $R^{12}$ and $R^{13}$ are chosen independently from the group comprising hydrogen, halogens, alkyl groups with 1 to 20, preferably 1 to 10 and especially preferably 1 to 6 carbon atoms, cycloalkyl groups with 3 to 8 carbon atoms, $R^{8*}_3Si$, $C(=Y^*)R^{5*}$, $C(=Y^*)$ $NR^{6*}R^{7*}$, wherein $Y^*$, $R^{5*}$, $R^{6*}$ and $R^{7*}$ are as defined hereinabove, COCl, OH (preferably one of the groups $R^{11}$, $R^{12}$ and $R^{13}$ is OH), CN, alkenyl or alkynyl groups with 2 to 20 carbon atoms, preferably 2 to 6 carbon atoms and especially preferably allyl or vinyl, oxiranyl, glycidyl, alkylene or alkenylene groups with 2 to 6 carbon atoms, which are substituted with oxiranyl or glycidyl, aryl, heterocyclyl, aralkyl, aralkenyl (aryl-substituted alkenyl, wherein aryl is as defined hereinabove and alkenyl is vinyl substituted with one or two $C_1$ to $C_6$ alkyl groups and/or halogen atoms, preferably with chlorine), alkyl groups with 1 to 6 carbon atoms, in which one to all of the hydrogen atoms, preferably one, are substituted by halogen (preferably fluorine or chlorine, if one or more hydrogen atoms are replaced, and preferably fluorine, chlorine or bromine if one hydrogen atom is replaced), alkyl groups with 1 to 6 carbon atoms, which are substituted with 1 to 3 substituents (preferably 1) chosen from the group comprising $C_1$ to $C_4$ alkoxy, aryl, heterocyclyl, $C(=Y^*)R^{5*}$ (wherein $R^{5*}$ is as defined hereinabove), $C(=Y^*)NR^{6*}N^{7*}$ (wherein $R^{6*}$ and $R^{7*}$ are as defined hereinabove), oxiranyl and glycidyl (preferably not more than 2 of the groups $R^{11}$, $R^{12}$ and $R^{13}$ are hydrogen, and especially preferably at most one of the groups $R^{11}$, $R^{12}$ and $R^{13}$ is hydrogen); m=0 or 1; and m=0, 1 or 2.

The particularly preferred initiators include benzyl halides, such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane; carboxylic acid derivatives which are halogenated at the α-position, such as propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides such as tetrachloromethane, tribromomethane, 1-vinylethyl chloride, 1-vinylethyl bromide; and halogen derivatives of phosphoric acid esters, such as dimethylphosphoric acid chloride.

The initiator is generally used in a concentration in the range of $10^{-4}$ mol/L to 3 mol/L, preferably in the range of $10^{-3}$ mol/L to $10^{-1}$ mol/L and especially preferably in the range of $5*10^{-2}$ mol/L to $5*10^{-1}$ mol/L, although these values are not to be construed as limitative. From the ratio of initiator to monomer there is obtained the molecular weight of the polymer, if the entire monomer is reacted. Preferably this ratio ranges between $10^{-4}$ and 1 to between 0.5 and 1, especially preferably between $1*10^{-3}$ and 1 to between $5*10^{-2}$ and 1.

The polymerization takes place in the presence of ligands that can form a coordination compound with the metallic catalyst or catalysts. Among other effects, these ligands function to increase the solubility of the transition metal compound. A further important function of the ligands is that the formation of stable organometallic compounds is prevented. This is particularly important, since these stable compounds would not polymerize under the chosen reaction conditions. It is further assumed that the ligands facilitate abstraction of the transferable group of atoms.

These ligands are known in themselves and are described in, for example, International Patents WO 97/18247 and WO 98/40415. These compounds generally contain one or more nitrogen, oxygen, phosphorus and/or sulfur atoms, via which the metal atom can be bound. Many of these ligands can be represented in general by the formula $R^{16}-Z(R^{18}-Z)_m-R^{17}$, wherein $R^{16}$ and $R^{17}$ independently denote H, $C_1$ to $C_{20}$ alkyl, aryl, heterocyclyl, which may or may not be substituted. Such substituents include among others alkoxy groups and alkylamino groups. $R^{16}$ and $R^{17}$ may or may not form a saturated, unsaturated or heterocyclic ring. Z denotes O, S, NH, $NR^{19}$ or $PR^{19}$, wherein $R^{19}$ has the same meaning as $R^{16}$. $R^{18}$ independently denotes a divalent group with 1 to 40 C atoms, preferably 2 to 4 C atoms, which may be straight-chain, branched or cyclic, such as a methylene, ethylene, propylene or butylene group. The meaning of alkyl and aryl has been explained hereinabove. Heterocyclyl groups are cyclic groups with 4 to 12 carbon atoms, in which one or more of the $CH_2$ groups of the ring is or are replaced by heteroatom-containing groups, such as O, S, NH and/or NR, wherein the group R has the same meaning as R[16].

A further group of suitable ligands can be represented by the formula (VIII)

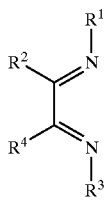

wherein $R^1$, $R^2$, $R^3$ and $R^4$ independently denote H, C1 to C20 alkyl, aryl, heterocyclyl and/or heteroaryl groups, wherein the groups $R^1$ and $R^2$ or respectively $R^3$ and $R^4$ can together form a saturated or unsaturated ring.

Preferred ligands in this connection are chelate ligands containing N atoms.

The preferred ligands include among others triphenylphosphane, 2,2-bipyridine, alkyl-2,2-bipyridine, such as 4,4-di-(5-nonyl)-2,2-bipyridine, 4,4-di-(5-heptyl)-2,2-bipyridine, tris(2-aminoethyl)amine (TREN), N,N,N',N', N"-pentamethyldiethylenetriamine, 1,1,4,7,10,10-hexamethyltriethylenetetramine and/or tetramethylethylenediamine. Further preferred ligands are described in, for example, International Patent WO 97/47661. The ligands can be used individually or as a mixture.

These ligands can form coordination compounds in situ with the transition metal, especially with copper, or with the transition metal compounds, or they can be synthesized first as coordination compounds and then added to the reaction mixture.

The ratio of ligand to transition metal depends on the dentate number of the ligand and on the coordination number of the transition metal. In general, the molar ratio ranges from 100:1 to 0.1:1, expediently from 10:1 to 0.1:1, preferably from 6:1 to 0.1:1 and especially preferably from 3:1 to 0.5:1, although these values are not to be construed as limitative.

The monomers, transition metal catalysts, ligands and initiators are selected as a function of the desired polymer solution. It is assumed that a high rate constant of the reaction between the complex of transition metal with ligand and the transferable group of atoms is essential for a narrow molecular weight distribution. If the rate constant of this reaction is too low, the concentration of radicals becomes too high, and so the typical termination reactions responsible for a broad molecular weight distribution occur. The exchange rate depends on, for example, the transferable group of atoms, the transition metal and the ligands.

The polymerization as a partial step of the present synthesis process can be performed with or without solvent. It is characteristic of the process that the catalyst is partly separated by filtration in the presence of at least one filter aid which contains at least 0.5 wt %, relative to the total weight of the filter aid, of repeating units that contain at least one carboxylic acid group, sulfonic acid group and/or at least one phosphonic acid group.

Accordingly, a solvent can be added before filtration or after polymerization, or else the polymerization takes place in the presence of a solvent. The term solvent is to be understood broadly in the present connection. For example, unreacted monomers that remain in the composition after the polymerization can also function as solvents. Preferably the polymerization takes place in a nonpolar solvent. This includes hydrocarbon solvents, examples being aromatic solvents such as toluene, benzene and xylene, and saturated hydrocarbons such as cyclohexane, heptane, octane, nonane, decane, dodecane, which may also be used in branched form. These solvents can be used individually and also as a mixture. Particularly preferred solvents are mineral oils and synthetic oils as well as mixtures thereof. Of these, mineral oils are most particularly preferred.

Mineral oils are known in themselves and are commercially available. They are generally obtained from petroleum or crude oil by distillation and/or refining and if necessary further purification and conversion processes. In this connection the term mineral oil applies in particular to the higher-boiling fractions of crude oil or petroleum. In general, the boiling point of mineral oil is higher than 200° C., preferably higher than 300° C. at 5000 Pa. Synthesis by low-temperature carbonization of shale oil, coking of bituminous coal, distillation of lignite with exclusion of air as well as hydrogenation of bituminous coal or lignite is also possible. A small proportion of mineral oils is also obtained from raw materials originating from plants (such as jojoba, rape) or animals (such as neatsfoot oil). Accordingly, mineral oils contain various proportions of aromatic, cyclic, branched and straight-chain hydrocarbons, depending on origin.

In general, a distinction is made between paraffin-base, naphthenic and aromatic fractions in crude oils or mineral oils. In this connection the term paraffin-base fraction stands for relatively long-chain or highly branched isoalkanes, and naphthenic fraction stands for cycloalkanes. Furthermore, depending on their origin and conversion process, mineral oils contain different proportions of n-alkanes, isoalkanes with low degree of branching, so-called monomethyl-branched paraffins, and compounds with heteroatoms, especially O, N and/or S, with which there are associated polar properties. The proportion of n-alkanes in preferred mineral oils is less than 3 wt %, the proportion of the compounds containing O, N and/or S is less than 6 wt %. The proportion of aromatics and of monomethyl-branched paraffins is generally in the range of 0 to 30 wt % each. According to one interesting aspect, mineral oil comprises mainly naphthenic and paraffin-base alkanes, which in general contain more than 13, preferably more than 18 and most particularly preferably more than 20 carbon atoms. The proportion of these compounds is generally ≧60 wt %, preferably ≧80 wt %, but these values are not to be construed as limitative. The mineral oil may contain 15 to 45 wt. % naphthenic constituents and 35 to 80 wt. % paraffinic constituents.

An analysis of especially preferred mineral oils performed using conventional techniques such as urea separation and liquid chromatography on silica gel reveals, for example, the following constituents. The mineral oil may contain from 0.05 to 5% of the polar compounds. In this connection, the percentage values refer to the total weight of the particular mineral oil being used:

n-alkanes with about 18 to 31 C atoms:
  0.7 to 1.0%,
slightly branched alkanes with 18 to 31 C atoms:
  1.0 to 8.0%,
aromatics with 14 to 32 C atoms:
  0.4 to 10.7%,
isoalkanes and cycloalkanes with 20 to 32 C atoms:
  60.7 to 82.4%,
polar compounds:
  0.1 to 0.8%
loss
  6.9 to 19.4%.:

Valuable information on analysis of mineral oils as well as a listing of mineral oils having different composition can be found in, for example, Ullmanns Encyclopedia of Industrial Chemistry, 5th Edition on CD-ROM, 1997, key word "lubricants and related products".

Synthetic oils include among other compounds organic esters, organic ethers such as silicone oils, and synthetic hydrocarbons, especially polyolefins. They are usually somewhat more expensive than mineral oils, but have advantages in terms of performance. Further elucidation can be found in the 5 API categories of base-oil types (API: American Petroleum Institute). In this connection these base oils can be used particularly preferably as solvents.

These solvents are used before or during the filtration, preferably in a proportion of 1 to 99 wt %, especially preferably 5 to 95 wt % and most particularly preferably 10 to 60 wt % relative to the total weight of the mixture. The polymerization can be performed at normal, reduced or above-atmospheric pressure. The polymerization temperature also is not critical. In general, however, it ranges from −20° to 200° C., preferably from 0° to 130° C. and especially preferably from 60° to 120° C. these values are not to be construed as limitative.

By means of the present process, polymers with a predetermined architecture can be obtained in simple manner. These possibilities result from the "living" character of the polymerization process. Such structures include among others block copolymers, such as two-block and three-block copolymers, gradient copolymers, star polymers, highly branched polymers, polymers with reactive terminal groups and graft copolymers. The polymers synthesized in this way generally have a molecular weight ranging from 1,000 to 1,000,000 g/mol, preferably from $10*10^3$ to $500*10^3$ g/mol, expediently from $10*10^3$ to $300*10^3$ g/mol, and especially preferably from $20*10^3$ to $300*10^3$ g/mol, although these values are not to be construed as limitative. These values refer to the weight-average molecular weight of the polydisperse polymers in the composition.

A particularly expedient version of the process according to the invention is characterized in that polymers with a weight-average molecular weight of $\geq 7{,}000$ g/mol are synthesized.

The special advantage of ATRP compared with conventional radical polymerization processes is that polymers with a narrow molecular weight distribution can be synthesized. While the following values are not to be construed as limitative, polymers obtained by the inventive process have a polydispersity, expressed by $M_w/M_n$, ranging from 1 to 12, preferably from 1 to 4.5, especially preferably from 1 to 3 and most particularly preferably from 1.05 to 2.

In the scope of the present invention, the catalyst is removed by filtration. This has proved to be most specially effective compared with other solid-liquid separation processes such as chromatography and centrifugation.

Filtration is known in itself and is described in, for example, Ullmann's Encyclopedia of Industrial Chemistry, Fifth Edition, key word "Filtration". Within the scope of the present invention, this term is understood to mean the separation of solid particles from a liquid by means of a porous layer (filtration agent), which is permeable for liquids, while the solids are retained. It is assumed that separation takes place on the basis of size differences.

The filtration material comprises among other substances loose or consolidated solid layers, such as masses of sand, coke, kieselguhr, plastics; filtering stones of quartz, fireclay, charcoal, plastics, woven or nonwoven fabrics of metal, natural, synthetic and glass fibers; sintered materials of metal, porcelain glass and other powders.

According to the invention, the filtration takes place in the presence of at least one filter aid, which has the purpose of ensuring that a filter cake is formed from suspensions containing only low levels of solids. For this purpose the filter aid is either added directly to the suspension to be filtered or is formed as an auxiliary layer on the filter before filtration. The filter aid used according to the invention contains, relative to the total weight of the filter aid, at least 0.5 wt % of repeating units which contain at least one carboxylic acid group

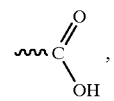

sulfonic acid group

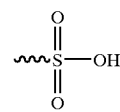

and/or at least one phosphonic acid group

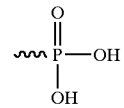

In the scope of the present invention, the term "repeating unit" means the basic building block from which a polymer is built up by several repetitions. Homopolymers are obtained from only one repeating unit, while copolymers have at least two different repeating units.

The filter aids that can be used according to the invention include among other substances (1) polymers and/or copolymers of ethylenically unsaturated organic compounds which contain at least one carboxylic acid group, sulfonic acid group and/or at least one phosphonic acid group, (2) polymers and/or copolymers in which the necessary quantities of carboxylic acid groups, sulfonic acid groups and/or phosphonic acid groups have been introduced by reactions analogous to those of polymers, as well as (3) polycondensates of monomers containing carboxylic acid groups, sulfonic acid groups and/or phosphonic acid groups.

Polymers and/or copolymers of type (1), which are particularly preferred in the scope of the present invention, comprise among other substances polymers and/or copolymers which are derived from the ethylenically unsaturated monomers with at least one carboxylic acid group, sulfonic acid group and/or at least one phosphonic acid group cited in the foregoing.

The polymerization of these ethylenically unsaturated monomers with at least one carboxylic acid group, sulfonic acid group and/or at least one phosphonic acid group can be performed if necessary in the presence of further ethylenically unsaturated monomers. Usable comonomers comprise the ethylenically unsaturated monomers of types a) to e) cited in the foregoing. A particularly effective filter aid is one that can be obtained by polymerization of the following monomer composition I) 0.5 to 20 wt %, relative to the total weight of the monomer composition, of one or more of the ethylenically unsaturated compounds with at least one carboxylic acid group, sulfonic acid group and/or at least one phosphonic acid group cited in the foregoing, and II) 99.5 to 80 wt %, relative to the total weight of the monomer composition, of one or more of ethylenically unsaturated ester compounds of formula (IX)

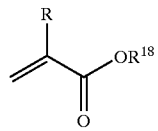

wherein R denotes hydrogen or methyl and $R^{18}$ denotes a straight-chain or branched alkyl group with 1 to 18 carbon atoms, and the sum of compounds I) and II) is 100 wt %.

The polymerization of these ethylenically unsaturated monomers with at least one carboxylic acid group, sulfonic acid group and/or at least one phosphonic acid group can be performed in ways known in themselves. Conceivable examples are radical bulk, solution, emulsion or suspension polymerization, anionic or cationic polymerization, preferably in solution, or Ziegler-Natta polymerization. The performance of controlled radical polymerizations, such as ATRP processes, RAFT processes and TEMPO processes is also possible.

Polymers and/or copolymers of type (2) are accessible in ways known in themselves by reaction of organic polymers, such as polystyrene, polymethylstyrene, tetrafluoropropylene with appropriate functionalizing agents, such as $SO_3$ or oxidizing agents. Examples comprise carboxylated or sulfonated polystyrene, sulfonated tetrafluoroethylene, polyisobutylene sulfonate, sulfonated polyethylene, sulfonated polyethylene-copropylene and sulfonated polypropylene.

The polymers and/or copolymers of type (3) include among others polycondensates that can be obtained by reaction of aliphatic, cycloaliphatic or aromatic diols with aliphatic, cycloaliphatic or aromatic dicarboxylic acids, by reaction of aliphatic, cycloaliphatic or aromatic primary or secondary diamines with aliphatic, cycloaliphatic or aromatic dicarboxylic acids, by reaction of aliphatic, cycloaliphatic or aromatic diols with aliphatic, cycloaliphatic or aromatic diisocyanates, by reaction of aliphatic, cycloaliphatic or aromatic primary or secondary diamines with aliphatic, cycloaliphatic or aromatic diisocyanates, or by polycondensation of carboxylic acids containing primary or secondary amino groups or hydroxy groups. For this purpose the compounds used contain at least partly at least carboxylic acid groups, sulfonic acid groups and/or phosphonic acid groups which are not converted in the course of the polycondensation.

This group of polymers and/or copolymers includes among other substances polyaspartic acid, polyglutamic acid, copolycondensates of aspartic acid and an aliphatic, cycloaliphatic or aromatic hydroxycarboxylic acid, such as lactic acid, copolycondensates of glutamic acid and an aliphatic, cycloaliphatic or aromatic hydroxycarboxylic acid, such as lactic acid, and polycitric acid.

In the scope of the present invention it has proved extremely effective for the at least one filter aid to be non-crosslinked, or in other words for it to exist preferably not as a three-dimensional polymer network. Particularly advantageous results can be achieved using a filter aid which has a weight-average molecular weight of greater than $300*10^3$ g/mol, expediently greater than $500*10^3$ g/mol, especially greater than $1,000*10^3$ g/mol.

Furthermore, the filter aid preferably has a higher weight-average molecular weight than the polymer composition. Under certain circumstances it is expedient to improve the effect of the at least one inventive filter aid even further by adding to the polymer composition filter aids that are known in themselves, such as cellulose, silica gel, Kieselgur (for example, ®Celite), bleaching earth (for example, ®Tonsil), perlite, wood charcoal and sawdust.

The filtration can be performed by filtration processes that are known in themselves, such as sieving, especially with membranes and microfilters, cake filtration, in which a filter cake is formed, and deep-bed filtration, in which the solid is deposited in the filter. For this purpose the filtration can be performed in batches or continuously, in which connection continuous filtration generally necessitates cleaning of the filter during filtration, as is achieved, for example, in cross-flow filtration.

The type of filter element is not critical. The person skilled in the art will choose a suitable element on the basis of his knowledge. The known filter elements include bag filters, belt filters, candle filters, disk filters, plate filters, drum filters, sheet filters and tubular filters.

An important feature of filtration is a pressure difference, which urges the liquid through the filter medium. This pressure difference can be generated in any way known in the art. This includes pumps, which can develop both above-atmospheric pressure as well as reduced pressure. Moreover, the liquid can also be pressed directly through the filter. Depending on viscosity, even a difference in head may be sufficient for flow of the composition through the filter.

Devices for performing the filtration are widely known and commercially available.

Preferably the composition is purified at a pressure difference ranging from 0.1 to 50 bar, preferably 1 to 10 bar and especially preferably 1.5 to 2.5 bar, with a filter having a sieve size ranging from 0.01 $\mu$m to 1 mm, preferably 1 $\mu$m to 100 $\mu$m and especially preferably 10 $\mu$m to 100 $\mu$m. These values are used as reference points, since purification also depends on the viscosity of the solvent and on the particle size of the precipitate.

The filtration is performed in a temperature range similar to that of polymerization, the upper range being dependent on the stability of the polymer. The lower limit is determined by the viscosity of the solution. In a particularly preferred embodiment of the present invention, filtration takes place in the range of 90 to 130° C.

The polymer compositions that can be obtained by the inventive process are characterized by a particularly low catalyst content. Preferably the catalyst content of the polymer compositions is $\leq 1000$ ppm, expediently $\leq 100$ ppm, especially <8 ppm.

As an example, the inventive polymer compositions can be used without further purification as additives in lubricating oils. Furthermore, the polymer can be isolated from the composition. For this purpose, the polymers can be separated from the composition by precipitation.

The invention will be explained in more detail hereinafter by examples and comparison examples, although the invention is not to be construed as limited to these examples.

a) Synthesis of the Polymer Mixtures to be Filtered:

Polymer batches 1 to 10 were processed according to the following general experimental procedure.

The ATRP polymerization experiments were performed in a four-necked round-bottomed flask equipped with sickle-shaped stirrer, heating mantle, nitrogen delivery line and high-efficiency condenser. In this connection the monomer mixture and the respective solvent were placed in the reaction flask and inerted by addition of dry ice and introduction of nitrogen. Thereafter the appropriate quantity of catalyst, CuCl or Cu(0) and ligand (pentamethyldiethylenetriamine (PMDETA)) were added.

After heating to 90° C., the appropriate quantity of initiator (ethyl 2-bromoisobutyrate (Ebib)) was added. The temperature in the reaction flask was raised to 100° C. After a reaction time of about 20 hours, the mixture was cooled to room temperature.

The quantities of the components used in each case are presented in Table 1. In Table 1, SM 920 denotes a mineral oil with a dielectric constant of 2.1, obtainable from Shell AG. MMA denotes methyl methacrylate. DPMA was obtained by the reaction of ®Dobanol 25L (of Shell AG) with methyl methacrylate. SMA was obtained by the reaction of ®Dehydad (of Henkel KGaA) with methyl methacrylate. Methanol liberated in these reactions was separated.

TABLE 1

Quantities of the components used in each case

| Batch | Monomer mixture [g] | Solvent [g] | Catalyst | Ligand | Initiator |
|---|---|---|---|---|---|
| 1 | DPMA:MMA 85:15 | SM 920 25 | CuCl | PMDETA | Ebib |
| 2 | DPMA:MMA 85:15 | SM 920 25 | CuCl | PMDETA | Ebib |
| 3 | DPMA:MMA 85:15 | SM 920 25 | CuCl | PMDETA | Ebib |
| 4 | DPMA:MMA 85:15 | SM 920 25 | CuCl | PMDETA | Ebib |
| 5 | DPMA:MMA 85:15 | SM 920 25 | CuCl | PMDETA | Ebib |
| 6 | DPMA:MMA 85:15 | SM 920 25 | Cu(0) | PMDETA | Ebib |
| 7 | DPMA:MMA 85:15 | SM 920 25 | Cu(0) | PMDETA | Ebib |
| 8 | DPMA:MMA 85:15 | SM 920 25 | Cu(0) | PMDETA | Ebib |
| 9 | DPMA:MMA 85:15 | SM 920 25 | Cu(0) | PMDETA | Ebib |
| 10 | MMA 100 | Toluene 67 | $Cu_2O$ | PMDETA | Ebib |

In batches 1 to 5, the molar ratio of CuCl:PMDETA:Ebib=0.5:0.1:1. The theoretical molecular weight was 20,000 g/mol. In batches 6 to 9, the molar ratio of Cu(0):PMDETA:Ebib=0.14 $cm^2$/g:0.2 wt %:0.98 wt %, in each case relative to the monomer mixture. The theoretical molecular weight was 20,000 g/mol. In batch 10 the molar ratio of $Cu_2O$:PMDETA:Ebib=1:1:1. The theoretical molecular weight was 35,000 g/mol.

b) Filter Aid

The inventive filter aids listed in Table 2 were obtained as follows:

b-1) Filter aid FHM 1

A mixture of 85 wt % of isodecyl acrylate, 10 wt % of methyl acrylate and 5 wt % of acrylic acid was polymerized in mineral oil Vestinol OA (Degussa-Hüls AG) at 85° C., using 0.1 wt % of tert-butyl per-2-ethylhexanoate relative to the monomer mixture in the batch. In this case the solid content of the batch toward the end of polymerization was 40 wt %. After 2 hours, reinitiation with 0.4 wt % of tert-butyl perisononanoate was performed, in order to lower the content of residual monomer.

b-2) Filter Aid FHM 2

A mixture of 18.9 wt % SMA, 71.1 wt % DPMA, 5 wt % acrylic acid and 5 wt % methacrylic acid was polymerized in 100 N mineral oil in the same way as for filter aid FHM 1.

b-3) Filter Aid FHM 3

A mixture of 90 wt % of butyl methacrylate, 5 wt % of acrylic acid and 5 wt % of methacrylic acid was polymerized in toluene at 70° C., using 0.2 wt % of tert-butyl perpivalate relative to the monomer mixture in the batch. In this case the solid content of the batch toward the end of polymerization was 40 wt %. Reinitiation with 0.4 wt % of tert-butyl perisononanoate was performed, in order to lower the content of residual monomer.

The following commercially available filter aids were used as reference materials:
polyacrylic acid (PAA), obtained from the Aldrich Co.
®Celite 560 of the Manville Corp., USA
®Celite 535 of the Manville Corp., USA
®Tonsil L80FF of Süd-Chemie AG c) Filtration of the Polymer Solutions For separation of the transition metal catalyst, the quantities of the respective filter aids indicated in Table 3 were added to the respective polymer solution. In this connection, the values for filter aids FHM 1, FHM 2 and FHM 3 are relative to the quantity of polymer used without solvent. Thereafter the reaction mixture was filtered using a filter press of the Seitz Co. with heatable metal jacket (type EF 14/2, constructed in 1990) and a deep-bed filter of the Seitz Co., whose respective type is indicated in Table 4. Filtration was performed at 100° C. and a gauge pressure of 2 bar. The filtrate obtained in this way was analyzed by means of GPC and AAS, in order to characterize the obtained polymer and the content of transition metal.

Table 4 presents the results obtained, such as filtration rate and copper content, while Table 5 presents the properties of the resulting polymers, such as number-average molecular weight Mn and polydispersity PDI (Mw/Mn) as well as kinematic viscosity $v^{100°\,C.}$ of the filtrate at 20% polymer content, determined according to ASTM-D 445.

TABLE 3

Filter aids used (all values in [g])

| Experiment | PAA | Celite 560 | Celite 535 | Tonsil L80FF | FHM1 | FHM2 | FHM3 |
|---|---|---|---|---|---|---|---|
| VB1 | — | — | — | — | — | — | — |
| VB2 | 0.5 | 1 | — | — | — | — | — |
| VB3 | — | 1 | — | 1 | — | — | — |
| B1 | — | 0.5 | — | — | 0.1 | — | — |
| VB4 | 0.5 | 1 | — | — | — | — | — |
| VB5 | — | 1 | — | 1 | — | — | — |
| B2 | — | 0.5 | — | — | — | 0.25 | — |
| VB6 | 0.5 | 1 | — | — | — | — | — |

TABLE 3-continued

Filter aids used (all values in [g])

| Experiment | PAA | Celite 560 | Celite 535 | Tonsil L80FF | FHM1 | FHM2 | FHM3 |
|---|---|---|---|---|---|---|---|
| VB7 | — | 1 | — | 1 | — | — | — |
| B3 | — | 1.5 | — | — | 1 | — | — |
| B4 | — | 0.5 | — | — | — | 0.2 | — |
| VB8 | 0.5 | 1 | — | — | — | — | — |
| VB9 | — | 1 | — | 1 | — | — | — |
| B5 | — | 1 | — | — | — | 0.1 | — |
| VB10 | — | 1 | — | 1 | — | — | — |
| B6 | — | 0.5 | — | — | — | — | — |
| VB11 | — | 1 | — | 1 | — | — | — |
| B7 | — | 0.5 | — | — | 0.1 | — | — |
| B8 | — | 0.5 | — | — | — | 0.1 | — |
| VB12 | 0.5 | 1 | — | — | — | — | — |
| VB13 | — | 1 | — | 1 | — | — | — |
| B9 | — | 0.3 | — | — | 0.1 | — | — |
| B10 | — | 0.3 | — | — | — | 0.1 | — |
| VB14 | — | — | — | — | — | — | — |
| VB15 | — | 1 | — | 1 | — | — | — |
| B11 | — | 0.5 | — | — | — | 0.05 | — |
| B12 | — | — | 1 | — | — | 0.05 | — |
| VB16 | — | 1 | — | 1 | — | — | — |
| B13 | — | 0.5 | — | — | — | 0.26 | — |
| VB17 | — | — | — | — | — | — | — |
| B14 | — | — | — | — | — | — | 0.5 |

[VB = Comparative Example; B = Example; FHM = Filter Aid]

TABLE 4

Filtration

| Experiment | Polymer solution by batch | Filter type | Filtration rate [kg/m²h] | Cu content [ppm] |
|---|---|---|---|---|
| VB1 | 1 | T2600 | 775 | 75 |
| VB2 | 1 | T2600 | 1100 | 14 |
| VB3 | 1 | T2600 | 897 | 11 |
| B1 | 1 | T2600 | 1406 | 16 |
| VB4 | 2 | T2600 | 760 | 510 |
| VB5 | 2 | T2600 | 275 | 470 |
| B2 | 2 | T2600 | 1253 | 480 |
| VB6 | 3 | T2600 | 360 | 430 |
| VB7 | 3 | T2600 | 307 | 230 |
| B3 | 3 | T2600 | 846 | 110 |
| B4 | 3 | T2600 | 148 | 22 |
| VB8 | 4 | T2600 | 634 | 49 |
| VB9 | 4 | T2600 | 639 | 28 |
| B5 | 4 | T2600 | 1014 | 9 |
| VB10 | 5 | T2600 | 173 | 310 |
| B6 | 5 | T2600 | not determined | 240 |
| VB11 | 6 | T2600 | 135 | 22 |
| B7 | 6 | T2600 | 220 | 5 |
| B8 | 6 | T2600 | 225 | 3 |
| VB12 | 7 | T2600 | 8 | 17 |
| VB13 | 7 | T2600 | not determinable | absent |
| B9 | 7 | T2600 | 56 | 7 |
| B10 | 7 | T2600 | about 40 | 9 |
| VB14 | 8 | T2600 | 336 | 28 |
| VB15 | 8 | T2600 | 43 | 19 |
| B11 | 8 | T2600 | 39 | 4 |
| B12 | 8 | T2600 | 43 | 4 |
| VB16 | 9 | T2600 | not determinable | 22 |
| B13 | 9 | T2600 | 33 | 2 |
| VB17 | 10 | 10 µm Gaff | | 110 |
| B14 | 10 | 10 µm Gaff | | 28 |

TABLE 5

Properties of the polymers

| Polymer solution by batch | $v^{100°\ C.}$ [cSt] | Mn [g/mol] | Polydispersity |
|---|---|---|---|
| 1 | 17.29 | 23,800 | 1.23 |
| 2 | 22.22 | 24,000 | 2.85 (bimodal) |
| 3 | 17.88 | 24,000 | 1.30 |
| 4 | 17.29 | 23,700 | 1.20 |
| 5 | 20.63 | 24,300 | 3.26 (bimodal) |
| 6 | 24.30 | 31,800 | 1.59 |
| 7 | 23.17 | 28,800 | 1.70 |
| 8 | 20.80 | 45,100 | 2.25 |
| 9 | 23.03 | 44,400 | 2.33 |
| 10 | | 37,700 | 1.33 |

[$v^{100°\ C.}$ is [cSt] and is based on 20% polymeric content]

What is claimed is:

1. A process comprising
polymerizing a mixture of ethylenically unsaturated monomers comprising less than 0.5 wt % of ethylenically unsaturated monomers having at least one carboxylic group, sulfonic acid group or phosphonic acid group, wherein wt % is relative to the total weight of the ethylenically unsaturated monomers, in the presence of one or more initiators having a transferable group of atoms, one or more catalysts comprising at least one transition metal, and one or more ligands which can form a coordination compound with the catalysts and, after the polymerization,
filtering the polymerized mixture in the presence of at least one filter aid which comprises at least 0.5 wt % of repeating units that contain at least one of a carboxylic acid group, sulfonic acid group or phosphonic acid group, wherein wt % is relative to the total weight of the filter aid.

2. The process according to claim 1, wherein the polymerization is carried out in solution.

3. The process according to claim 2, wherein the polymerization is carried out in a nonpolar solvent.

4. The process according to claim 3, wherein the polymerization is carried out in a mineral oil, a synthetic oil or a mixture thereof.

5. The process according to claim 4, wherein the polymerization is carried out in the presence of a mineral oil which comprises 0.5 to 30 wt % of aromatic constituents, 15 to 40 wt % of naphthenic constituents, 35 to 80 wt % of paraffinic constituents, up to 3 wt % of n-alkanes and 0.05 to 5 wt % of polar compounds, wherein wt % is relative to the total weight of the mineral oil.

6. The process according to claim 1, wherein a solvent is present in an amount of from 5 to 95 wt % relative to the total weight of the liquid composition.

7. The process according to claim 1, comprising polymerizing a monomer mixture comprising 50 to 100 wt. % of one or more ethylenically unsaturated ester compounds of formula (I), wherein wt. % is relative to the total weight of the ethylenically unsaturated monomers,

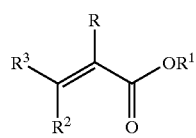
(I)

wherein R is hydrogen or methyl, $R^1$ is a straight-chain or branched alkyl group with 1 to 40 carbon atoms, $R^2$ and $R^3$ independently are hydrogen or a group of the formula —COOR', wherein R' is hydrogen or a straight-chain or branched alkyl group with 1 to 40 carbon atoms.

8. The process according to claim 1, comprising polymerizing a monomer mixture comprising one or more ethylenically unsaturated monomers which comprise from 50 to 100 wt % of one or more ethylenically unsaturated ester compounds of formula (II), wherein wt % is relative to the total weight of the ethylenically unsaturated monomers,

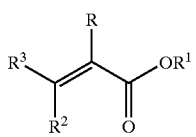
(II)

wherein R is hydrogen or methyl, $R^1$ a straight-chain or branched alkyl group with 8 to 40 carbon atoms, $R^2$ and $R^3$ independently are hydrogen or a group of the formula —COOR', wherein R' is hydrogen or a straight-chain or branched alkyl group with 8 to 40 carbon atoms.

9. The process according to claim 1, comprising polymerizing a monomer composition comprising at least 50 wt % of one or more (meth)acrylates of formula (III)

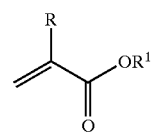
(III)

wherein R is hydrogen or methyl and $R^1$ is a straight-chain or branched alkyl group with 8 to 40 carbon atoms.

10. The process according to claim 1, comprising polymerizing a monomer composition comprising a) 60 to 100 wt % of one or more ethylenically unsaturated ester compounds of formula (II)

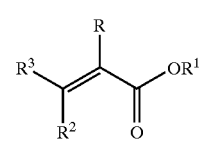
(II)

wherein R is hydrogen or methyl, $R^1$ is a straight-chain or branched alkyl group with 8 to 40 carbon atoms, carbon atoms, $R^2$ and $R^3$ independently are hydrogen or a group of the formula —COOR', wherein R' is hydrogen or a straight-chain or branched alkyl group with 8 to 40 carbon atoms, b) 0 to 40 wt % of one or more (meth)acrylates of formula (IV)

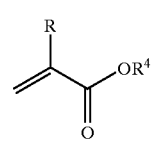
(IV)

wherein R is hydrogen or methyl and $R^4$ is a straight-chain or branched alkyl group with 1 to 7 carbon atoms, c) 0 to 40 wt % of one or more (meth)acrylates of formula (V)

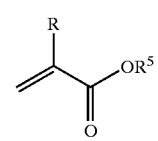
(V)

wherein R is hydrogen or methyl and $R^5$ is an alkyl group, substituted with an OH group, with 2 to 20 carbon atoms, or an alkoxylated group of formula (VI)

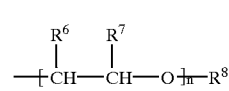
(VI)

wherein $R^6$ and $R^7$ independently are hydrogen or methyl, $R^8$ is hydrogen or an alkyl group with 1 to 40 carbon atoms, and n is an integral number from 1 to 60, d) 0 to 40 wt % of one or more (meth)acrylates of formula (VII)

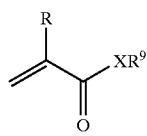

(VII)

wherein R is hydrogen or methyl, X is oxygen or an amino group of formula —NH— or wherein $R^{10}$ is an alkyl group with 1 to 40 carbon atoms, and $R^9$ is a straight-chain or branched alkyl group, substituted by at least one —$NR^{11}R^{12}$ group, with 2 to 20 carbon atoms, wherein $R^{11}$ and $R^{12}$ independently of one another are hydrogen, an alkyl group with 1 to 20 carbon atoms, or wherein $R^{11}$ and $R^{12}$ form a 5-membered or 6-membered ring, which includes a nitrogen atom and, optionally, one further nitrogen or oxygen atom, and which may or may not be substituted with $C_1$ to $C_6$ alkyl, and e) 0 to 40 wt % of one or more comonomers, wherein wt % is relative to the total weight of the ethylenically unsaturated monomers.

11. The process according to claim 8, wherein the monomer mixture comprises styrene, (meth)acrylate derivatives, dispersing monomers, or a mixture thereof 12. The process according to claim 1, wherein the catalyst comprises at least one of metallic copper, $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

13. The process according to claim 1, wherein the ligand comprises at least one chelate ligand containing N atoms.

14. The process according to claim 1, wherein the initiator comprises at least one compound containing Cl, Br or I.

15. The process according to claim 1, wherein the filter aid comprises at least one non-crosslinked filter aid.

16. The process according to claim 1 comprising
   filtering with a filter aid obtained by polymerization of the following monomer composition
   I) 0.5 to 20 wt %, relative to the total weight of the monomer composition, of one or more of the ethylenically unsaturated compounds with at least one of a carboxylic acid group, sulfonic acid group or phosphonic acid group, and
   II) 99.5 to 80 wt %, relative to the total weight of the monomer composition, of one or more ethylenically unsaturated ester compounds of formula (IX)

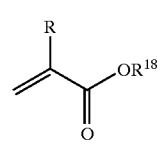

(IX)

wherein R is hydrogen or methyl and $R^{18}$ is a straight-chain or branched alkyl group with 1 to 18 carbon atoms, and the sum of compounds I) and II) is 100 wt %.

17. The process according to claim 1, comprising filtering at a temperature of from 90 to 130° C.

18. The process according to claim 1, wherein the monomer mixture is polymerized to form one or more polymers with a weight-average molecular weight of 7,000 g/mol.

19. The process according to claim 1, further comprising isolating the polymerized monomer mixture.

20. The process of claim 8, wherein $R^1$ is a straight-chain or branched alkyl group with 10 to 40 carbon atoms and R' is hydrogen or a straight-chain or branched alkyl group with 10 to 40 carbon atoms.

21. The process of claim 9, wherein $R^1$ is a straight-chain or branched alkyl group with 10 to 40 carbon atoms.

22. The process of claim 10, wherein, in formula IV, $R^1$ is a straight-chain or branched alkyl group with 10 to 40 carbon atoms and R' is hydrogen or a straight-chain or branched alkyl group with 10 to 40 carbon atoms, and $R^9$ is a straight-chain or branched alkyl group, substituted by at least one —$NR^{11}R^{12}$ group, with 2 to 6 carbon atoms and $R^{11}$ and $R^{12}$ independently of one another are hydrogen and alkyl group with 1 to 6 carbon atoms.

* * * * *